United States Patent Office 3,328,362
Patented June 27, 1967

3,328,362
PREPARATION OF MODIFIED POLYMERS
William J. Roberts, Bernardsville, Joseph Di Pietro, New Providence, and Charles L. Smart, Millington, N.J., assignors to Celanese Corporation, a corporation of Delaware
No Drawing. Filed Jan. 30, 1964, Ser. No. 341,433
18 Claims. (Cl. 260—79.3)

This invention relates broadly to the preparation of modified polymers. More particularly, it is concerned with a method of introducing polar groups into a polymer such as thermoplastic, organic polymer containing residual, reactive, double bonds and which are lacking or deficient in polar groups. Examples of starting polymeric reactants include preformed, thermoplastic, organic polymers derived from polyhydrocarbons, e.g., polyolefins such as polyethylene, polypropylene and the higher polyalkylenes, polystyrene, poly-(methylstyrenes), poly-($\alpha$-methylstyrene), poly-(isopropenyltoluene), polybutadiene, the thermoplastic polymeric allyl compounds, and copolymers (binary, ternary, etc.) of such monomeric olefins in any proportions. Because of its higher rate of reactivity, the preferred starting polymeric reactant is one that contains terminal ethylenic unsaturation.

Many different methods have been proposed for modifying thermoplastic and thermosetting polymers to improve their properties or to increase their field of utility. This is often desirable in order to improve such properties as adhesiveness, dyeability, printability, dispersibility, antistatic characteristics, compatibility with other materials including other polymers, and the like. Such methods have included, for example, irradiation, sulfonation, chlorination, fluorination, reduction in the case of polymers containing reducible groups, treatment with isocyanates in the case of polymers having adsorbed and/or absorbed moisture or containing active hydrogen atoms, and many others.

It is a primary object of the present invention to provide a new and unobvious method of introducing polar groups into a polymer of the kind broadly and specifically described in the first paragraph of this specification. Examples of polar groups that may be introduced into the polymer are $$-COOH, -CN, -SO_3O, -COOR, -CHO \text{ and } -\overset{O}{\underset{\|}{C}}-R'$$

where R and R' are hydrocarbon radicals which are free from ethylenic or acetylenic unsaturation, and preferably an alkyl radical more particularly a $C_1$ to about $C_6$ alkyl radical.

It is a further object of the present invention to provide a method such as that described above that can be carried out with readily available equipment, which is relatively inexpensive and with relatively low operating cost per unit weight of polymer treated.

It is a further object of the invention to provide a method whereby the properties of polymers, especially thermoplastic organic polymers, can be improved in such properties as those mentioned in the second paragraph of this specification, and whereby the fields of utility of the polymers are broadened.

Other objects of the invention will be apparent to those skilled in the art as the description of the invention proceeds.

The foregoing and other objects of the invention are attained by reacting (1) a polymer of the kind hereinbefore described, and which contains residual reactive double bonds, in the presence of a free-radical initiator such as a free-radical peroxy initator, with (2) a molar excess over stoichiometrical proportions of a chain-transfer agent that contains polar groups. The chain-transfer agent may be in gaseous or liquid state but preferably is in liquid state at the reaction temperature. The reaction is continued until the desired degree of saturation of double bonds in the aforesaid polymer has been effected.

THE POLYMERIC REACTANT

The polymers used in practicing this invention generally have a molecular weight above about 350, e.g., from about 400 to 3000 or more. They may contain any amount of residual, reactive ethylenic unsaturation but from a practical standpoint it is usually desirable that the polymer contain an average of more than 0.1 reactive ethylenic (specifically vinyl) group, preferably at least about 0.2 such group, per 100 carbon atoms in the polymer. The polymer may contain a higher ratio of vinyl or other reactive ethylenic groups, e.g., from 0.3 to 3.5 or more such groups per 100 carbon atoms, as desired or as conditions may require in order to produce a modified polymer having the desired properties for a particular service application.

If the polymer does not initially have reactive ethylenic unsaturation therein, such unsaturation can be imparted to the polymer by any suitable means, e.g., by pyrolysis. For instance, a preformed polymer such as a poly(alpha-olefin), e.g., polyethylene, having an average molecular weight of from about 10,000 to about 500,000 can be pyrolyzed to introduce ethylenically unsaturated groups such as vinyl groups therein. Any suitable pyrolysis temperature may be used but ordinarily temperatures within the range of from about 700° F. to about 1000° F., and more particularly about 700°–800° F., are effective.

It is also usually desirable to extract the organic solvent-soluble material from the pyrolized polymer before using it (i.e., the residue remaining after extraction) in accordance with this invention. Any of the commercially available solvents or extractants may be used for this purpose such as the various ketones, e.g., acetone, diethyl ketone, di-n-propyl ketone, diisopropyl ketone, methyl ethyl ketone, etc.

A similar technique can be employed in introducing reactive ethylenic unsaturation into other preformed polymers, examples of which were given in the first paragraph of this specification while others are given hereafter. The conditions of pyrolysis may be varied, of course, depending upon the particular polymer being pyrolyzed, the average number of vinyl or other ethylenic groups it is desired to be present in the polymer, and other influencing factors.

Other polymers adapted or adaptable for use in practicing this invention, in addition to those mentioned in the first paragraph of this specification, include poly-(3-methylbutene-1), poly-(4-methylpentene-1), poly-(vinylcyclohexanes), poly-(vinylnaphthalenes), poly-(allylbenzenes), poly-(methallylbenzenes), poly-($\alpha$-methyl-p-methylstyrene), and other poly-(ethylenically unsaturated hydrocarbons) including both straight-chain and cyclic types or kinds; the various unsaturated polyesters (both modified and unmodified) such as polymers of ethylene glycol maleate, diethylene glycol fumarate, diethylene glycol maleate phthalate, ethylene glycol itaconate, diethylene glycol maleate succinate, an allyl alcohol-modified diethylene glycol maleate and others known in the art (e.g., U.S. Patent No. 2,818,362, col. 5, lines 14–42, and in the patents cited therein).

Still other examples are the polymers formed or derived from the nuclear halo-, cyano- and other substituted aromatic hydrocarbons containing vinyl, allyl, isopropenyl or other ethylenically-unsaturated aliphatic side chain, e.g., the various o-, m- and p-chlorostyrenes, -bromostyrenes and -fluorostyrenes, o-, m- and p-cyanostyrenes, and the various halo- and cyano-substituted allylbenzenes; and polymers formed or derived from unsaturated ethers, e.g., ethyl vinyl ether, isopropyl vinyl ether, isobutyl vinyl ether, isooctyl vinyl ether, octadecyl vinyl ether, diallyl ether, divinyl ether of butanediol, divinyl ether of diethylene glycol, etc.; from the various unsaturated ketones, e.g., methyl vinyl ketone, ethyl vinyl ketone, butyl vinyl ketone, etc.; or from the various unsaturated dioxalanes, e.g., 4-vinyl-1, 3-dioxalane, 4-vinyl-2-phenyl-1, 3-dioxalane, 4-allyl-1, 3-dioxalane and 4-allyloxymethyl-1, 3-dioxalane.

The starting polymeric reactant may be formed or derived from copolymers of any of the aforementioned comonomers with each other, or from one or more of them with one or more other ethylenically-unsaturated (preferably terminal ethylenically-unsaturated) monomers that are copolymerizable therewith.

THE CHAIN-TRANSFER AGENT

The chain-transfer agent is one that contains polar groups, and may be gaseous or liquid either initially or under the conditions of reaction, but preferably it is in liquid state under reaction conditions. The chain-transfer agent (if normally a solid) may be liquefied at the reaction temperature and/or by dissolution in an inert (substantially completely inert), liquid, reaction medium such as an inert, liquid, organic solvent or diluent.

Examples of chain-transfer agents that may be used are acids and anhydrides, for instance the lower alkanoic acids and anhydrides, and more particularly those represented by the general formula R—COOH wherein R represents hydrogen or an alkyl radical containing from 1 to about 5 carbon atoms, and anhydrides of such acids. Another useful sub-class of chain-transfer agents are the organic sulfur-containing acids, especially the organic sulfonic acids, and more particularly the alkane-sulfonic acids such as those represented by the general formula $R^1$—$SO_3H$ wherein $R^1$ represents an alkyl radical containing from 1 to about 5 carbon atoms. In some cases it may be desirable to use a salt of the organic sulfonic acid instead of the acid itself. Examples of such compounds are those represented by the general formula $(R^2$—$SO_3)_n$—Me, where $R^2$ represents an alkyl radical containing from 1 to about 5 carbon atoms, Me represents a monovalent or polyvalent, inorganic, salt-forming cation, and $n$ represents an integer which corresponds to the valence of Me. Thus, Me may represent such cations as, for example, sodium, potassium or other alkali metal, calcium, strontium, barium or magnesium.

Other examples of useful chain-transfer agents are the nitriles, especially the lower alkyl nitriles such as acetonitrile and others embraced by the general formula $R^3$—CN wherein $R^3$ represents an alkyl radical containing from 1 to about 5 carbon atoms. Still other examples are primary and secondary alcohols including those represented by the formulas $R^4$—OH and

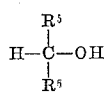

wherein $R^4$, $R^5$ and $R^6$ represent an alkyl radical containing from 1 to about 5 carbon atoms and advantageously are methyl or ethyl radicals; esters such as methyl, ethyl and higher alkyl esters of formic, acetic, propionic and higher alkanoic acids; aldehydes including those represented by the general formula $R^7$—CHO wherein $R^7$ represents an alkyl radical containing from 1 to about 5 carbon atoms; and ketones such as dimethyl ketone, methyl ethyl ketone, and other available symmetrical and unsymmetrical dialkyl ketones, especially those that contain lower alkyl groups.

THE FREE-RADICAL INITIATOR

Although not limited thereto, the free-radical initiator advantageously is a peroxide and, more particularly, an organic peroxide such as a dialkyl peroxide. Thus, the initiator may be one represented by the general formula

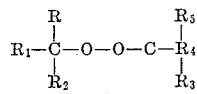

wherein the various R's, which may be the same or different but which are preferably symmetrical, represent a member of the group consisting of hydrogen and alkyl (including cycloalkyl), aralkyl, aryl and alkaryl radicals. Illustrative examples of radicals represented by the various R's are methyl, ethyl and propyl through octadecyl (both normal and isomeric forms), cyclopentyl, cyclohexyl, cycloheptyl, benzyl, phenylethyl, phenylpropyl, phenyl, tolyl, xylyl and others that will be apparent to those skilled in the art from the foregoing illustrative examples. Specific examples of peroxides embraced by the above formula also will be apparent to those skilled in the art from the aforementioned specific examples of substituents represented by the various R's.

More specific examples of free-radical initiators are di-t.-butyl peroxide, di-t.-amyl peroxide and other dialkyl peroxides; the symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; the unsymmetrical or mixed diacyl peroxides, e.g. acetyl benzoyl peroxide, propionyl benzoyl peroxide, etc.; the organic per-salts, e.g., t-butyl perbenzoate, t-amylperbenzoate, etc.; the inorganic per-salts, e.g., the sodium, potassium and other alkali-metal and the ammonium per-salts such as the persulfates, perborates and perphosphates; and others known in the art (e.g., U.S. Patent No. 2,818,362, column 5, line 68 through line 38, column 6).

CONDITIONS OF REACTION

*Proportions of reactants.*—The starting polymeric reactant is reacted with the chain-transfer agent using a molar excess (e.g., from about 3.0 moles to about 500 or more moles in excess) of the latter over stoichiometrical proportions. The molar excess of chain-transfer agent over stoichiometrical proportions may be relatively small (i.e., toward the lower portion of the range) when the reaction is carried out in an inert, liquid, reaction medium, e.g., a liquid, saturated, aliphatic hydrocarbon; and may be relatively large (i.e., toward the higher portion of the range) when a liquid chain-transfer agent is used in a large molar excess, and the excess of which over stoichiometrical proportions functions as a reaction medium in which the reaction is effected. Thus, from about 3.0 to about 50 or more moles of the chain-transfer agent may be employed for each reactive (preferably terminal), ethylenically-unsaturated site in the polymeric reactant when the reaction is carried out in an inert, liquid solvent or diluent; and from about 3.0 to about 500 or more moles of chain-transfer agent for each of the aforesaid sites when the chain-transfer agent is one wherein the molar excess thereof can function as a liquid reaction medium.

The amount of free-radical initiator may be considerably varied but generally is present in the reaction mass in from about 0.01 to about 20 mole percent of the molar amount of polymer to be modified.

*Temperature of reaction.* — The reaction is usually carried out under heat, e.g., at a temperature ranging between about 60° C. to 250° C. or even 300° C., depending, for instance upon the particular polymer, chain-transfer agent and initiator employed, the particular mode of operation (i.e., continuously, semi-continuously or batch), type of equipment used, and other influencing factors. The free-radical initiator is especially important in connection with the temperature of reaction since the different initiators decompose at different temperatures. In batch-type operations, the reaction is usually carried out under reflux at the boiling temperature of the reaction mass.

*Pressure of reaction.*—The reaction may be carried out at atmospheric, superatmospheric or subatmospheric pressures or by any combinations thereof.

*Time of reaction.*—In general, the time of the reaction will vary with the particular reactants employed and the temperature of the reaction, as well as with the mode of operation. Thus, in batch operations under reflux it may range, for example, from ½ to 6 days or more. The time may be shortened by carrying out the reaction at a higher temperature or both at a higher temperature and superatmospheric pressure. Of course, one should then use a free-radical initiator which decomposes at the higher temperature employed.

*Reaction medium.*—As indicated hereinbefore, the reaction may be carried out in an inert, liquid reaction medium. By "inert" or "substantially completely inert" is meant a reaction medium, solvent or diluent which is so inert under the reaction conditions that it will not adversely affect the course of the reaction or the reaction products. By "liquid" is meant a reaction medium which is liquid at the reaction temperature. In other words, the reaction medium may or may not be liquid at normal or ambient temperature so long as it is liquid or in liquid state at the reaction temperature. Preferably, the inert, liquid, reaction medium is one which is volatile (volatilizable) without decomposition.

Any reaction medium meeting the above requirements is satisfactory for use. More specific examples of such reaction media are the alkanes, e.g., n-hexane, n-heptane, n-octane, isooctane, n-nonane and higher members of the homologous series.

It is not essential that all of the free-radical initiator be added initially to the reaction mixture along with the other ingredients. Thus, better results are sometimes obtained when the initiator is added gradually during the course of the reaction, for instance while heating under reflux conditions. The initiator may be added in increments while heating under reflux, or a solution of the initiator may be pumped slowly into the reaction zone throughout the reaction period.

The modified polymer is isolated, for example, by cooling the reaction mass to room temperature or lower, then adding an excess of cold water to the cooled mass until the modified polymer precipitates from solution. Unreacted or by-product materials are usually eliminated either prior to cooling or prior to the addition of water. The precipitated polymer is then separated from the liquid phase by any suitable means, e.g., by filtration, decantation, etc.

In order that those skilled in the art may better understand how the present invention can be carried into effect, the following examples are given by way of illustration and not by way of limitation.

Example 1

A polyhydrocarbon waxy material with a molecular weight of about 450, M.P. 48°–49° C. and containing an average of about 0.94 vinyl group per 100 carbon atoms is used in this example. This polymer is obtained from the pyrolysis of polyethylene having a molecular weight of approximately 100,000, followed by extraction with a liquid extractant, more particularly by Soxhlet extraction with acetone.

A mixture of 100 g. of the above-described polyhydrocarbon material, 300 g. of a chain-transfer agent, specifically acetic acid, and 0.1 molar quantity of a free-radical initiator, specifically di-tert.-butyl peroxide is heated under reflux conditions to 115°–120° C. for 48 hours. A carboxylated, non-waxy, polyhydrocarbon material possessing the following properties is obtained: Molecular weight of about 510, M.P. 64°–68° C., possessing free carboxyl groups and completely free from vinyl groups.

Simialr results are obtained when the foregoing example is repeated but substituting, in individual runs, 0.1 molar quantity of the following free-radical initiators in place of the same amount of di-tert.-butyl peroxide:
 (a) Di-tert.-amyl peroxide
 (b) Di-tert.-butyl perbenzoate
 (c) Acetyl peroxide
 (d) Benzoyl peroxide
 (e) Potassium persulfate Similar results are obtained when 3000 g. of acetic anhydride is used instead of 3000 g. of acetic acid.

Example 2

Same as in Example 1 with the exception that, in individual runs, the following chain-transfer agents are used in place of (a) acetic acid or (b) acetic anhydride:
 (1) Methanol
 (2) Isopropyl alcohol
 (3) Methyl acetate
 (4) Acetonitrile In all cases modified polyhydrocarbon material that contains no detectable vinyl groups is obtained.

Example 3

Same as in Example 1 with the exception that one-fourth of the total amount of peroxide is added initially and the remainder in three equal amounts at approximately 12-hour intervals during the 48-hour period of heating under reflux, yielding a carboxylated polymer.

Similar results are obtained when Examples 1, 2 and 3 are repeated but using 0.3 molar quantity of free-radical initiator and a polyhydrocarbon material derived from polyethylene (by pyrolysis at 800° F. but without subsequent Soxhlet extraction). It contains an average of about 0.43 vinyl group per 100 carbon atoms; M.P. 115°–117° C.

Example 4

Same as in Example 1 with the exception that the polyhydrocarbon waxy material is one having the following characteristics: M.P. 88°–91° C., molecular weight about 1100, and containing an average of about 0.27 vinyl group per 100 carbon atoms. A carboxylated polyhydrocarbon material possessing no detectable vinyl groups in its chain is obtained.

Similar results are obtained when 8000 g. of acetic acid is used instead of 3000 g.

Example 5

Example 1 is repeated but substituting for the polyhydrocarbon material derived from polyethylene of that example a polyhydrocarbon material derived from polypropylene. This starting polymeric reactant contains an average of more than 0.1 vinyl group, specifically an average of about 0.2 vinyl group, per 100 carbon atoms. There is obtained a carboxylated polymer having no detectable vinyl groups in its chain.

Example 6

A sample of 90 g. of polyhydrocarbon material M.P. 115°–117° C., obtained from the pyrolysis of high-molecular-weight polyethylene at about 800° F., and containing 0.43 vinyl group per 100 carbon atoms, is heated in the presence of 1.8 liters of isooctane, 96 g. of an alkanesulfonic acid, specifically methanesulfonic acid, and 0.05 molar quantity of di-tert.-butyl peroxide under reflux conditions (i.e., boiling temperature of the reaction mass) for 45 hours. A sulfonated, non-waxy, polyhydrocarbon material having the following characteristics is obtained: M.P. 104°–107° C.; sulfur content, 1.6%; no detectable vinyl groups upon infrared examination; presence of suffonic acid groups is indicated by infrared examination.

Similar results are obtained when the peroxide initiator is added initially and after three 11- to 12-hour intervals (approximately) to the refluxing reaction mass during the 45-hour heating period.

Instead of methanesulfonic acid as in Example 6, one may use other alkane-sulfonic acids, preferably lower alkanesulfonic acids such as ethane- through pentanesulfonic acids.

*Example 7*

Same as in Example 6 with the exception that, instead of the polymeric starting reactant of that example, there is used the polyhydrocarbon waxy material described under Example 4 and which contains an average of about 0.27 vinyl group per 100 carbon atoms. A sulfonated polyhydrocarbon material containing no detectable vinyl groups in its chain is obtained.

*Example 8*

This example illustrates the marked improvement in properties attained by polymers resulting from the method of this invention as compared with corresponding polymers wherein polar groups have not been incorporated into the molecule as an integral part thereof.

A polyhydrocarbon material containing an average of 1.4 carboxyl groups per 100 C atoms, having an average molecular weight of about 500, M.P. 65°–70° C., and produced as described under Example 1, is blended with polyethylene in a proportion, by weight, of 40 parts of the former to 60 parts of the latter, together with 0.03% (by weight of the total polymers) of a heat-stabilizing agent, specifically diethyl maleate. The stabilized blend is then melt-mixed at 160° C. for 10 minutes with mechanical stirring under an atmosphere of nitrogen. Films, 5″ x 5″ x 0.010″, are prepared by compression-molding a sample of the blended polymers at 150° C. for 5 minutes under 20 tons pressure.

A clear, colorless film is obtained. This film contains an average of 0.56 carboxyl group per 100 carbon atoms in the admixed polymers. Its dye pick-up is good, as evidenced by the fact that the film is dyed a dark blue when dyed in conventional manner with a blue dye. In marked contrast a film made in the same manner from the unmodified polyethylene (i.e., without the addition of the carboxylated polyhydrocarbon material) remained undyed when treated with the same blue dye.

Another sample of the film made from the blend is tested for ink adhesion (Commercial Standard Test CS227–59). The ink-adhesion value is 40% as compared with 0% value for a film made from the unmodified material.

It will be understood, of course, by those skilled in the art that the present invention is not limited only to the specific ingredients, proportions thereof, and conditions of reaction given in the foregoing illustrative examples. For instance, instead of the polymers derived from the poly-(alpha-olefins) employed in the foregoing examples, viz., polyethylene and polypropylene, one may use any other homopolymeric or copolymeric alpha-olefin or any other homopolymer or copolymer that contains residual, reactive, terminal or internal (but preferably terminal) double bonds and which is lacking or deficient (for a particular service application) in polar groups. Included in such homopolymers and copolymers are those specifically mentioned by way of illustration in the portion of this specification prior to the examples. Of particular interest as starting polymeric reactants are homopolymers of ethylene and propylene, copolymers of ethylene with propylene and/or other ethylenically-unsaturated comonomers, and copolymers of propylene with other ethylenically-unsaturated comonomers. More specific examples of such copolymers are copolymers of ethylene and/or propylene with such alpha-olefins as styrene, vinylcyclohexane, 3-methylbutene-1 and 4-methylpentene-1.

It is to be understood that the foregoing detailed description is given merely by way of illustration and that many variations may be made therein without departing from the spirit of our invention.

The embodiments of the invention in which an exclusive property or privilege is claimed are as follows:

1. The method of introducing polar groups into an organic polymer containing 0.1 to 3.5 residual, reactive, double bonds per 100 carbon atoms, said method comprising reacting the said polymer in the presence of a free-radical initiator with groups excess over stoichiometrical proportions of a chain-transfer agent that contains from 3 to 500 moles per mole of ethylenically unsaturated site in said polymer of a polar compound selected from the group consisting of unsubstituted alkanoic acids containing 1 to 6 carbon atoms, anhydrides of said acids and alkansulfonic acids and salts containing 1 to 5 carbon atoms until the desired degree of saturation of the said double bonds in the said polymer by the said polar groups has been effected.

2. A method as in claim 1, wherein the organic polymer is a thermoplastic organic polymer.

3. A method as in claim 2, wherein the thermoplastic organic polymer is a preformed thermoplastic organic polymer.

4. A method as in claim 3, wherein the preformed thermoplastic organic polymer is a preformed thermoplastic hydrocarbon polymer.

5. A method as in claim 4, wherein the source of the defined hydrocarbon polymer includes a polymer of an ethylenically-unsaturated hydrocarbon.

6. A method as in claim 5, wherein the polymer of an ethylenically-unsaturated hydrocarbon comprises a polymer of ethylene.

7. A method as in claim 5, wherein the polymer of an ethylenically-unsaturated hydrocarbon comprises a polymer of propylene.

8. A method as in claim 1, wherein the free-radical initiator is an organic peroxide.

9. A method as in claim 8, wherein the organic peroxide is a dialkyl peroxide.

10. A method as in claim 1, wherein said polar compound is at least one member of the group consisting of acetic acid and acetic anhydride.

11. A method as in claim 1, wherein said polar compound comprises an alkanesulfonic acid.

12. A method as in claim 11, wherein the alkanesulfonic acid comprises methanesulfonic acid.

13. A method as in claim 1, wherein the free-radical initiator is an organic peroxide, and said peroxide is added gradually to the reaction mass during the course of heating under reflux conditions.

14. A method as in claim 1, wherein the polymeric reactant is a poly-(alpha-olefin).

15. A method as in claim 14, wherein the poly-(alpha-olefin) is a polyethylene containing an average of at least about 0.2 vinyl group per 100 carbon atoms and having an average molecular weight above about 350.

16. The method of carboxylating a polymer derived from ethylene and containing 0.1 to 300 residual, terminal, double bonds per 100 carbon atoms which comprises heating said polymer admixed with (1) from 3 to 500 moles per mole of ethylenically-unsaturated site in said polymer of at least one member of the group consisting of acetic acid and acetic anhydride and (2) a free-radical initiator comprising a peroxide represented by the general formula:

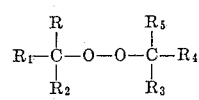

wherein the various R's represent a member of the group consisting of hydrogen and alkyl, aralkyl, aryl and alkaryl radicals, said heating being effected under reflux conditions and being continued until the said polymer has been substantially completely carboxylated at the said double bonds.

17. The method of sulfonating a polymer derived from ethylene and containing 0.1 to 300 residual, terminal, double bonds per 100 carbon atoms which comprises heating an inert, liquid, reaction medium containing (1) said polymer, (2) from 3 to 500 moles per mole of ethylenically-unsaturated site in said polymer of an alkanesulfonic acid containing 1 to 5 carbon atoms, and (3) a free-radical initiator comprising a peroxide represented by the general formula:

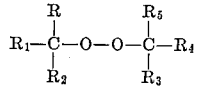

wherein the various R's represent a member of the group consisting of hydrogen and alkyl, aralkyl, aryl and alkaryl radicals, said heating being effected under reflux conditions and being continued until the said polymer has been substantially completely sulfonated at the said double bonds.

18. A method as in claim 17, wherein the alkanesulfonic acid is methanesulfonic acid and the peroxide is a dialkyl peroxide.

References Cited

UNITED STATES PATENTS 2,811,514  10/1957  Hagemeyer _____ 260—79.3 X
2,964,515  12/1960  Rader _____ 260—94.9

JOSEPH L. SCHOFER, Primary Examiner.

D. K. DENENBERG, Assistant Examiner.